United States Patent
Whitehouse

Patent Number: 5,123,614
Date of Patent: Jun. 23, 1992

[54] ANTI-DEPLOYMENT DEVICE FOR A RAM AIR TURBINE

[75] Inventor: John W. Whitehouse, Rockford, Ill.

[73] Assignee: Sundstrand Corporation, Rockford, Ill.

[21] Appl. No.: 592,956

[22] Filed: Oct. 4, 1990

[51] Int. Cl.$^5$ .............................. B64D 41/00
[52] U.S. Cl. .................. 244/58; 244/102 SL; 416/14; 416/142; 416/220 R; 440/54
[58] Field of Search .............. 244/58, 137.4, 102 R, 244/102 SL; 416/14, 48, 142 R, 155, 220 R, 87, 140 R; 440/54

[56] References Cited
U.S. PATENT DOCUMENTS

| | | | |
|---|---|---|---|
| 2,608,257 | 8/1952 | Godfrey | 416/140 R |
| 3,069,116 | 12/1962 | Ward | 244/58 |
| 3,149,678 | 9/1964 | Chilman et al. | 244/58 X |
| 4,676,458 | 6/1987 | Cohen | 244/58 |

Primary Examiner—Joseph F. Peters, Jr.
Assistant Examiner—Christopher P. Ellis
Attorney, Agent, or Firm—Antonelli, Terry, Stout & Kraus

[57] ABSTRACT

An anti-deployment device and method for preventing inadvertent deployment of a ram air turbine of an aircraft during servicing or repair of turbine employ an anti-deployment pin which can be manually inserted in a support arrangement for the pin on the aircraft when the ram air turbine is in the stowed position for preventing deployment of the turbine upon release of a lock mechanism which locks the turbine in the stowed position. The pin has an elongated body with an outer, flat contact surface portion which extends in a plane that is inclined with respect to a longitudinal center axis of the pin.

30 Claims, 2 Drawing Sheets

111
ANTI-DEPLOYMENT DEVICE FOR A RAM AIR TURBINE

TECHNICAL FIELD

The present invention relates to an anti-deployment device and method, and the combination of such a device with a ram air turbine of an aircraft, for preventing inadvertent deployment of the turbine during repair or servicing of the aircraft.

BACKGROUND ART

An auxiliary power ram air turbine is typically deployed by a spring loaded actuator. Storing the ram air turbine means the compressed actuator may have a spring force of several thousand pounds ready to eject the ram air turbine when the release mechanism is actuated. Inadvertent release of such a device in the presence of ground crew could result in very serious injury. This could occur, for example, by the accidental release of the conventional locking mechanism for locking the ram air turbine in the stowed position.

U.S. Pat. No. 4,676,458 discloses one conventional deployment mechanism for a ram air turbine wherein a spring-loaded deployment actuator is operable to move the ram air turbine from a stowed position to a deployed position upon release of a conventional up-lock. U.S. Pat. No. 3,149,678 discloses wind motors for aircraft which are retractable into the body of the aircraft. A spring-loaded retraction jack moves the ram air turbine to the deployed position upon release of an up-lock.

U.S. Pat. No. 3,069,116 discloses emergency generator and vacuum producing means for airplanes wherein a combined generator and vacuum producing unit is projected to use position by a compressed, coiled spring upon the withdrawal of a manually released detent. None of these prior art devices provides a safety lock, in addition to the up-lock mechanism to prevent an inadvertent activation of the ram air turbine while the aircraft is being repaired or serviced.

DISCLOSURE OF INVENTION

An object of the present invention is to provide an anti-deployment device and the method which overcomes the aforementioned disadvantage of conventional arrangements for stowing and deploying a ram air turbine on an aircraft. More particularly, an object of the invention is to provide an anti-deployment device and a method which can conveniently be used as during servicing or repair of the aircraft to prevent inadvertent deployment of the ram air turbine such as in the case of accidental release of the conventional lock mechanism which normally locks the ram air turbine in the stowed position.

A further object of the invention is to provide an anti-deployment device and method which are useful as a "backup" safety device and method as during servicing and repair of the aircraft, wherein the possibility of dangerous free travel, i.e. backlash, of the ram air turbine in moving from a position maintained by the normal up-lock device and that of the anti-deployment device of the invention, is eliminated. Damaging shock loads which could result from such free travel of the ram air turbine are thereby avoided.

These and other objects are attained by the method of the invention for preventing inadvertent deployment of a ram air turbine of an aircraft during servicing or repair of the aircraft wherein the turbine is mounted on the aircraft by a mounting arrangement for movement between a stowed position and a deployed position, a lock mechanism releasably locks the ram air turbine in the stowed position and an actuator moves the ram air turbine from the stowed position to the deployed position upon release of the lock mechanism, the method comprising the steps of inserting an anti-deployment pin in a pin support arrangement on the aircraft when the ram air turbine is in the stowed position such that the pin contacts a portion of the mounting arrangement movably mounting the ram air turbine so as to preclude deployment of ram air turbine upon release of the lock mechanism, servicing or repairing the aircraft, and removing the anti-deployment pin so as not to preclude deployment of the ram air turbine upon release of the lock mechanism. As a result of the method, inadvertent release of the spring-loaded actuator in the presence of the ground crew does not result in deployment of the ram air turbine or serious injury to the ground crew.

The method of the invention further comprises maintaining the pin in contact with a portion of the pin mounting arrangement during the step of servicing or repairing. The step of maintaining includes biasing the pin in contact with the mounting arrangement by applying a spring force against the pin. This feature of the invention is important for eliminating the possibility of a backlash gap existing between the anti-deployment pin and the mounting arrangement for the ram air turbine whereby damaging shock loads from free travel of the ram air turbine before restraint by the anti-deployment pin are avoided.

The anti-deployment device according to the invention for preventing inadvertent deployment of a ram air turbine during servicing or repair of the aircraft, wherein the ram air turbine is mounted on an aircraft by a mounting arrangement for movement of the turbine between a stowed position and a deployed position with a lock mechanism for locking the ram air turbine in the stowed position and an actuator for moving the ram air turbine from the stowed position to the deployed position upon release of the lock mechanism, comprises an anti-deployment pin which can be manually inserted in a support arrangement for the pin on the aircraft when the ram air turbine is in the stowed position for preventing deployment of the ram air turbine upon release of the lock mechanism. The pin according to the disclosed, preferred embodiment includes an elongated body having an outer, flat contact surface portion which extends in a plane which is inclined to a longitudinal center axis of the pin. The flat surface portion of the pin is adapted to engage a flat surface portion of the mounting arrangement. A slot is formed in the pin for cooperation with a projection on the support arrangement for properly orienting the flat contact surface portion of the pin with respect to the flat contact surface portion of the mounting arrangement when the pin is supported on the aircraft. The slot extends axially from one end of the elongated body of the pin. A handle is also preferably provided on the pin to facilitate manual insertion of the pin in the support arrangement on the aircraft by ground personnel before they begin servicing or repair of the aircraft.

The anti-deployment device further comprises means for yieldably biasing the pin in an axial direction when the pin is inserted in a support arrangement for the pin on the aircraft. The means for yieldably biasing comprises a sleeve which surrounds the pin and a spring located between the pin and the sleeve, a portion of the sleeve being connectable to the support arrangement of the device when the pin is properly inserted into the support arrangement.

The support arrangement for the pin includes at least an aperture therein for receiving the anti-deployment pin. More specifically, in the preferred form of the invention, the support arrangement comprises first and second spaced support members which have respective, aligned apertures for receiving respective portions of the anti-deployment pin. The anti-deployment pin has a relatively smaller diameter portion at a leading end thereof, a relatively larger diameter portion at a location spaced from the leading end with the outer, and a flat contact surface portion between the relatively smaller diameter portion and the relatively larger diameter portion.

The aperture of the first support member has a relatively small diameter for receiving the smaller diameter portion of the pin and the aperture of the second support member has a relatively larger diameter for receiving the larger diameter portion of the pin. One end of the sleeve surrounding the pin has a screw thread or other connecting means formed thereon for cooperation with a complementary screw thread or connecting means provided on the second support member. A projection in the form of a set screw extends into the aperture of the first support member for cooperation with the slot in the leading end of the pin to insure the proper orientation of the flat contact surface portion of the pin as referred to above. When properly oriented, the flat contact surface portion of the pin engages the similarly inclined flat contact surface portion on the mounting arrangement for the ram air turbine. The flat contact surface portion of the mounting arrangement is formed on a stop arm which is connected to a strut of the mounting arrangement in the illustrated embodiment.

More generally, the present invention is directed to a combination comprising a ram air turbine, a mounting arrangement mounting the ram air turbine on an aircraft for movement between a stowed position and a deployed position, a lock mechanism for locking the ram air turbine in the stowed position, an actuator for moving the ram air turbine from the stowed position to the deployed position upon release of the lock mechanism, and an anti-deployment device for preventing inadvertent deployment of the ram air turbine as during servicing or repair of the aircraft upon release of the lock mechanism, the anti-deployment device comprising an anti-deployment pin and a support arrangement connected to the aircraft into which the pin can be manually inserted for supporting the pin in a position to prevent deployment of the ram air turbine upon release of the lock mechanism. Preferably, the pin contacts a portion of the mounting arrangement when the pin is supported in the support arrangement and the anti-deployment device further comprises means for maintaining the pin in contact with the mounting arrangement to prevent a gap from being formed between the two while the pin is inserted in the support arrangement even in the case of slight movement of the mounting arrangement and ram air turbine.

These and other objects, features and advantages of the present invention will become more apparent from the following description when taken in connection with the accompanying drawings, which show, for the purposes of illustration only, one embodiment in accordance with the present invention.

BEST MODE FOR CARRYING OUT THE INVENTION

Figure 1:
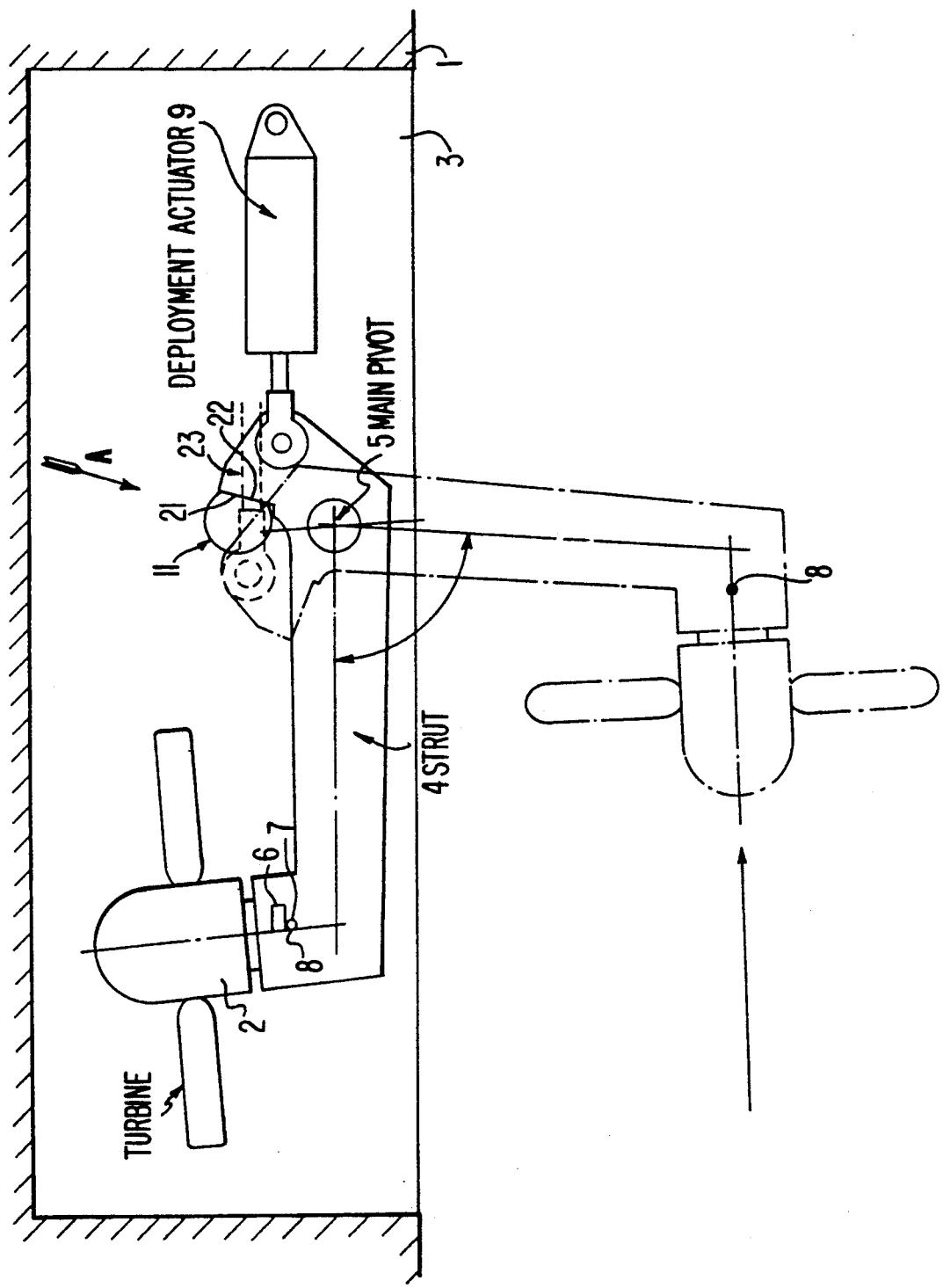
FIG. 1 is a schematic illustration of a portion of an aircraft and, particularly, a ram air turbine of the aircraft and a mounting arrangement for moving the turbine between a stowed position shown in solid line and a deployed position shown in dashed line, wherein an anti-deployment pin of an anti-deployment device of the invention is employed for preventing inadvertent deployment of the ram air turbine from the stowed position.
Figure 2:
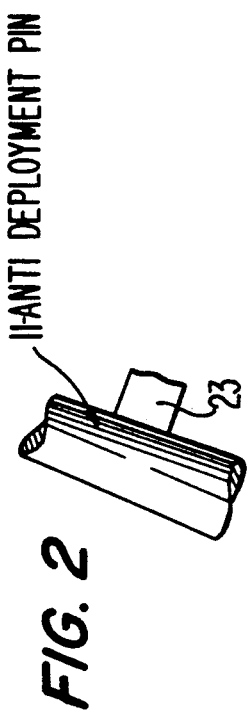
FIG. 2 is a view of the anti-deployment pin and a portion of a stop arm of a strut of the mounting arrangement contacted by the pin as viewed in the direction A in FIG. 1.

A portion of an aircraft 1, particularly an airplane, is illustrated in FIG. 1 wherein it is seen that a ram air turbine 2 is stowed in an opening or recess 3 in the lower portion of the fuselage of the aircraft. The ram air turbine 2 is pivotably supported by a mounting arrangement 4 in the form of a strut for pivotable movement about a main pivot 5 which is secured to the aircraft. The ram air turbine 2 is held in the stowed position shown in solid lines in FIG. 1 by means of a conventional up-lock 6 which may, for example, have a catch pawl 7 which coacts with a pin 8 on the housing on the ram air turbine or the adjacent strut. When the ram air turbine is deployed, access doors, not shown, over the opening 3 are opened and a signal from the aircraft cockpit, either mechanically through a cable or electrically, releases the catch pawl 7 and the weight of the ram air turbine together with the spring force of a conventional spring-loaded deployment actuator 9 will cause the ram air turbine 2 to pivot counter clockwise about the main pivot 5 to the deployed position shown in dashed lines in FIG. 1.

The spring force of the compressed deployment actuator 9 may be several thousand pounds for ejecting the ram air turbine 2 from the opening 3 to the deployed position when the up-lock 6 is released. Inadvertent release of the up-lock 6 in the presence of ground crew as during servicing or repair of the aircraft could result in very serious injury. To prevent such inadvertent deployment of the ram air turbine during servicing or repair of the aircraft where the turbine is in the stowed position as depicted in FIG. 1, according to the method of the invention an anti-deployment device 10 of the invention is employed to block movement of the ram air turbine from the stowed position during servicing or repair of the aircraft. Accidental release of the conventional up-lock 6 during servicing or repair of the aircraft will, therefore, not result in deployment of the ram air turbine or injure the ground crew. More specifically, according to the method of the invention an anti-deployment pin 11 of the device 10 is inserted in a pin support arrangement 12 of the device when the ram air turbine is in the stowed position such that the pin 11 contacts a portion of the mounting arrangement 4 for the ram air turbine so as to preclude deployment of the ram air turbine upon release of the up-lock 6. The pin is manually inserted before servicing or repair of the aircraft and, thereafter, manually removed so as not to preclude deployment of the ram air turbine upon release of the up-lock 6 during flight of the aircraft 1.

The possibility of dangerous free travel or backlash that could result in damaging shock loads as the released ram air turbine hits the anti-deployment pin 11 is avoided according to the invention by maintaining the pin in contact with the mounting arrangement while the pin is inserted in the pin support arrangement 12. Preferably, the pin is biased in contact with the mounting arrangement by application of a force from a spring 13 acting against the pin 11 as explained below with reference to FIG. 3.

The pin support arrangement 12 for the pin 11 is formed by a pair of spaced support members 14 and 15 on respective sides of the strut of the mounting arrangement 4. The support members 14 and 15 are securely connected to the aircraft frame. Aligned apertures 16 and 17 are formed in the respective support members 14 and 15 for receiving and supporting the pin 11 in a position to block rotary movement of the strut 4 about the main pivot 5 and thereby movement of the ram air turbine from the stowed position in the direction of the deployed position. A projection 18 in the form of a set screw is mounted in the support member 15 so as to extend into the aperture 17 thereof.

Figure 3:
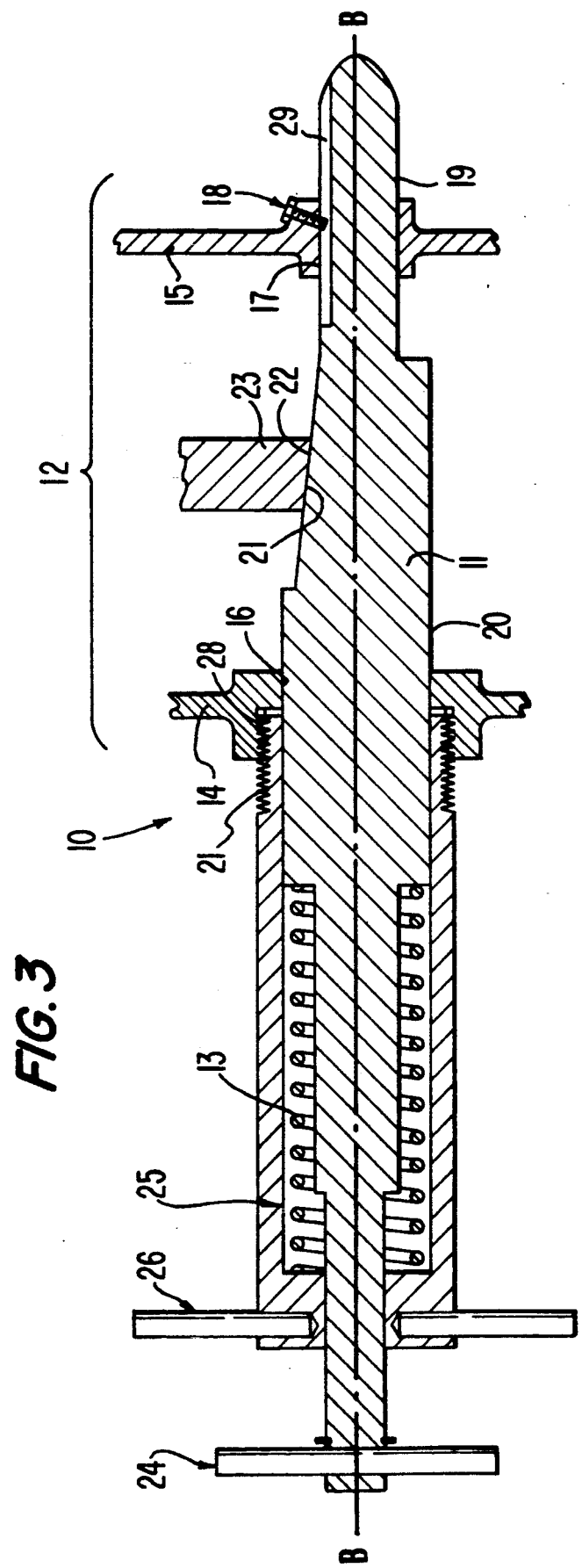
FIG. 3 is a cross-sectional view of the anti-deployment device of the invention taken along the longitudinal center axis of the anti-deployment pin of the device and illustrating portions of a pair of spaced support members of the support arrangement of the device connected to the aircraft and supporting the pin in its position of use for preventing inadvertent deployment of the ram air turbine.

The anti-deployment pin 11 has a straight, elongated body with a relatively small diameter portion 19 at the leading end thereof. A relatively larger diameter portion 20 is spaced inwardly from the portion 19 of the pin for support within the relatively larger diameter aperture 16 of the support member 14. A flat contact surface portion 21 is formed on the outer surface of the pin 11 between the portions 19 and 20. The flat contact surface portion 21 is inclined with respect to a longitudinal center axis B—B of the pin as shown in FIG. 3. A contact surface 22 on a stop arm 23 of the strut 4 is inclined in a like manner with respect to the longitudinal center axis of the pin as supported in the apertures in the support members 14 and 15. In the preferred embodiment, the strut, including the stop arm, is made from an aluminum alloy and the pin is made of steel. The opposing flat contact surface portions of the pin and stop arm are preferred to avoid point or line contact which could result in deformation of the stop arm where it makes contact with the pin.

The inclination of the flat contact surface portion 21 of the pin 11 with respect to the axis B—B advantageously allows the pin to be maintained in contact with the stop arm even with slight movement of the stop arm by axially biasing the pin 11 to the right as shown in FIG. 3 while slidingly supporting the pin in the support members 14 and 15. That is, after the pin 11 is initially pushed into the pin support arrangement 12 using handle 24, which is connected to the elongated body of the pin as by welding, for example, so that the flat contact surface portion 21 of the pin engages the contact surface portion 22 of the stop arm 23, a locking sleeve 25 which surrounds the pin 11 is screwed down onto support member 14 using handle 26 on the sleeve by way of cooperating screw threads 27 and 28 on the sleeve 25 and the support member 14, respectively. The spring 13 is compressed between opposed surfaces of the sleeve and pin as shown in FIG. 3 when the sleeve is threadedly connected to the support member 14 for yieldably biasing the pin to the right to insure that the flat contact surface portion 21 of the pin remains in contact with the flat contact surface portion 22 of stop arm 23 during aircraft service.

An axially directed slot 29 is formed in the outer surface of the pin 11 at the leading end thereof for cooperation with the set screw 18 in the aperture 17 of the support member 15 during insertion of the pin in the pin support arrangement 12. When the set screw is received in the slot 29 to allow insertion of the pin 11 through the aperture 17, the flat contact surface portion 21 of the pin faces the flat contact surface 22 of the stop arm 23. The axial lengths of the individual components of the anti-deployment device 10 are arranged so that the thread 27 on the locking sleeve 25 will not engage the thread 28 about the aperture 16 in support member 14 if the slot 29 and set screw 18 are not themselves engaged.

While I have shown and described only one embodiment in accordance with the present invention, it is understood that the same is not limited thereto, but is susceptible to numerous changes and modifications as known to those skilled in the art. Therefore, I do not wish to be limited to the details shown and described herein, but intend to cover all such changes and modifications as are encompassed by the scope of the appended claims.

I claim:

1. An anti-deployment device for preventing inadvertent deployment of a ram air turbine mounted on an aircraft between a stowed position and a deployed position, said anti-deployment device comprising an anti-deployment pin and a support arrangement adapted to be connected to the aircraft and in which said pin can be manually inserted for supporting the pin in a position for preventing deployment of the ram air turbine, said pin including an elongated body having an outer, flat contact surface portion which extends in a plane that is inclined with respect to a longitudinal center axis of the pin.

2. The anti-deployment device according to claim 1, wherein said pin further comprises a slot in the pin for properly orienting the flat contact surface portion of the pin when the pin is supported in the support arrangement.

3. The anti-deployment device according to claim 2, wherein said slot extends axially from one end of the elongated body of the pin.

4. The anti-deployment device according to claim 1, further comprising a handle on said pin for manually inserting the pin in said support arrangement.

5. The anti-deployment device according to claim 1, further comprising means for yieldably biasing the pin in an axial direction when the pin is inserted in said support arrangement.

6. The anti-deployment device according to claim 5, wherein said means for yieldably biasing comprises a sleeve surrounding the pin and a spring located between the pin and the sleeve, a portion of the sleeve being connectable to said support arrangement.

7. The anti-deployment device according to claim 1, wherein said support arrangement includes at least one support member having an aperture therein for receiving the anti-deployment pin.

8. The anti-deployment device according to claim 7, wherein said support arrangement comprises first and second spaced support members which have respective, aligned apertures for receiving respective portions of the anti-deployment pin.

9. The anti-deployment device according to claim 8, wherein said anti-deployment pin has a relatively smaller diameter portion at a leading end thereof and a relatively larger diameter portion at a location spaced from said leading end with said flat contact surface portion of the pin being located between the relatively smaller diameter portion and the relatively larger diameter portion of the pin, and wherein the aperture of said first support member has a relatively small diameter for receiving the smaller diameter portion of the pin and the aperture of the second support member has a relatively large diameter for receiving the larger diameter portion of the pin.

10. The anti-deployment device according to claim 9, further comprising means for biasing the pin in the direction of said first support member, said biasing means comprising a sleeve which surrounds the pin and a spring located between the pin and the sleeve, one end of the sleeve having means for connecting the sleeve to said second support member.

11. The anti-deployment device according to claim 10, wherein said connecting means is a screw thread located at the one end of said sleeve which cooperates with a complementary screw thread provided on said second support member.

12. The anti-deployment device according to claim 8, further comprising a projection connected to one of said support members and extending into the aperture thereof for cooperation with the slot in the pin to insure proper orientation of the flat contact surface portion of the pin upon insertion of the pin in the support member, and wherein the axial lengths of the components of the device being selected such that said screw thread on the connecting means can engage the complementary screw thread on said second support member only when said projection is located in the slot of the pin.

13. The anti-deployment device according to claim 12, wherein said projection is a set screw.

14. In combination, a ram air turbine, a mounting arrangement mounting the ram air turbine on an aircraft for movement between a stowed position and a deployed position, a lock mechanism for locking the ram air turbine in the stowed position, an actuator for moving the ram air turbine from the stowed position to the deployed position upon release of the lock mechanism, and an anti-deployment device for preventing inadvertent deployment of the ram air turbine during service or repair of the turbine upon release of the lock mechanism, said anti-deployment device comprising an anti-deployment pin and a support arrangement connected to the aircraft into which the pin can be manually inserted for supporting the pin in a position to prevent deployment of the ram air turbine upon release of the lock mechanism.

15. The combination according to claim 14, wherein said pin contacts a portion of the mounting arrangement when the pin is supported in said support arrangement, and wherein said anti-deployment device further comprises means biasing the pin in contact with said portion of the mounting arrangement to prevent a gap from being formed between the two when the pin is inserted in the support arrangement.

16. The combination according to claim 14, wherein said mounting arrangement comprises a strut for pivotably mounting the ram air turbine on the aircraft for movement between a stowed position and a deployed position.

17. The combination according to claim 16, wherein said strut includes a stop arm having a surface portion which is contacted by the pin when the pin is supported in the support arrangement.

18. The combination according to claim 17, wherein the contact surface portion of said stop arm is flat and wherein said pin includes a flat contact surface portion which abuts against the flat contact surface portion of the stop arm when the pin is supported in the support arrangement.

19. The combination according to claim 18, wherein the flat contact surface portions of the pin and stop arm are both inclined in like manner with respect to a longitudinal center axis of the pin when the pin is supported in the support arrangement.

20. The combination according to claim 19, wherein said pin comprises a slot and the support arrangement comprises a projection for insertion in the slot for properly orienting the flat contact surface portion of the pin with respect to that of the stop arm when the pin is supported in the support arrangement.

21. The combination according to claim 19, further comprising means for yieldably biasing the pin in an axial direction to urge the inclined, flat contact surface portion thereof into contact with the inclined, flat contact surface portion of the stop arm whereby a gap between the two is avoided.

22. The combination according to claim 14, wherein the pin includes a handle for manually inserting the pin in the support arrangement on the aircraft.

23. The combination according to claim 14, wherein the support arrangement comprises first and second spaced support members which have respective, aligned apertures for receiving respective portions of the anti-deployment pin.

24. The combination according to claim 23, wherein the anti-deployment pin has a relatively smaller diameter portion at a leading end thereof and a relatively larger diameter portion at a location spaced from said leading end with an outer, flat contact surface portion extending intermediate the relatively smaller diameter portion and the relatively larger diameter portion, and wherein the aperture of the first support member has a relatively smaller diameter for receiving the smaller diameter portion of the pin and the aperture of the second support member has a relatively larger diameter for receiving the larger diameter portion of the pin.

25. The combination according to claim 24, wherein said anti-deployment device further comprises means for biasing the pin in the direction of said first support member, said biasing means comprising a sleeve which surrounds the pin and a spring located between the pin and the sleeve, one end of the sleeve having means for connecting the sleeve to said second support member.

26. The combination according to claim 25, wherein the means for connecting the sleeve to said second support member is a screw thread located at the one end of said sleeve which cooperates with a screw thread provided on said second support member.

27. A method for preventing inadvertent deployment of a ram air turbine of an aircraft during servicing or repair of the aircraft where the turbine is mounted on the aircraft by a mounting arrangement for movement between a stowed position and a deployed position, a lock mechanism releasably locks the ram air turbine in the stowed position and an actuator moves the ram air turbine from the stowed position to the deployed position upon release of the lock mechanism, said method comprising the steps of inserting an anti-deployment pin in a pin support arrangement on the aircraft when the ram air turbine is in the stowed position such that the pin contacts a portion of the mounting arrangement for the ram air turbine so as to preclude deployment of the ram air turbine upon release of the lock mechanism, servicing or repairing the aircraft, and removing the anti-deployment pin so as not to preclude deployment of the ram air turbine upon release of the lock mechanism.

28. The method according to claim 27, further comprising maintaining the pin in contact with said portion of the mounting arrangement during said step of servicing or repairing.

29. The method according to claim 28, wherein said step of maintaining includes biasing the pin in contact with the portion of the mounting arrangement by applying a spring force against said pin.

30. The method according to claim 27, wherein the mounting arrangement comprises a strut for pivotably mounting the ram air turbine on the aircraft for movement between a stowed position and a deployed position, said strut comprising a stop arm having a surface as said portion which the pin contacts to preclude deployment of the ram air turbine.

* * * * *